July 18, 1933.  P. E. KLOPSTEG  1,918,402
RADIO DEMONSTRATION APPARATUS
Original Filed Nov. 4, 1929    4 Sheets-Sheet 1
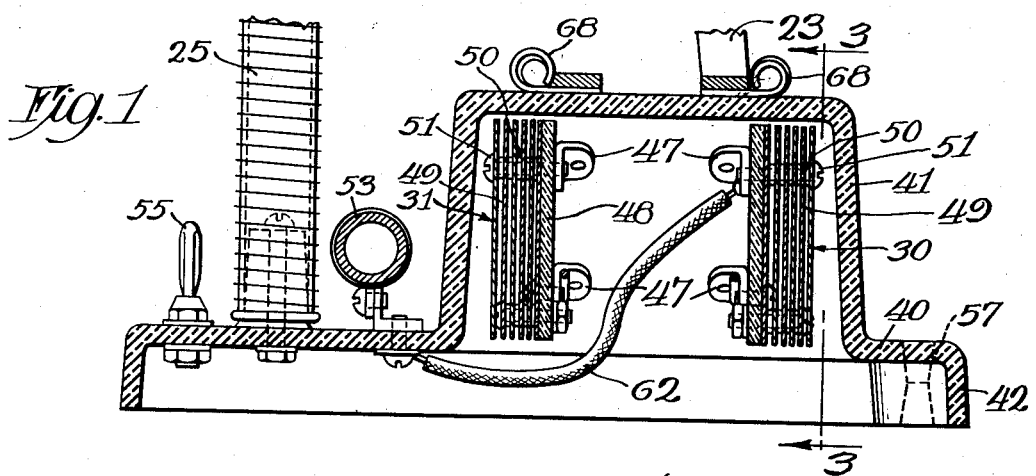
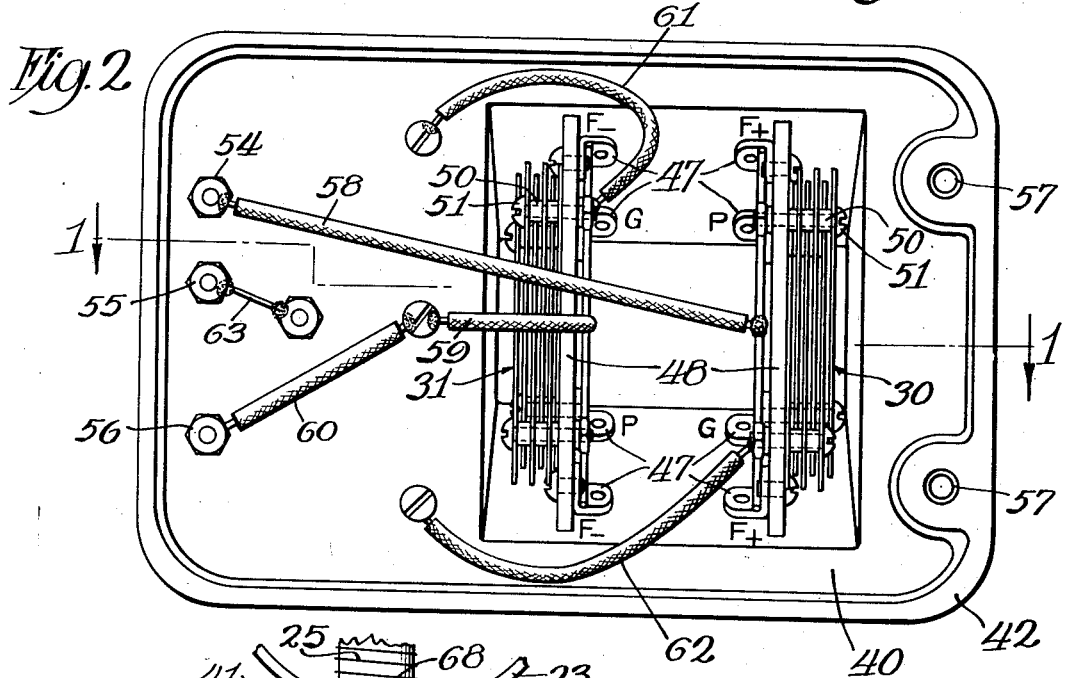
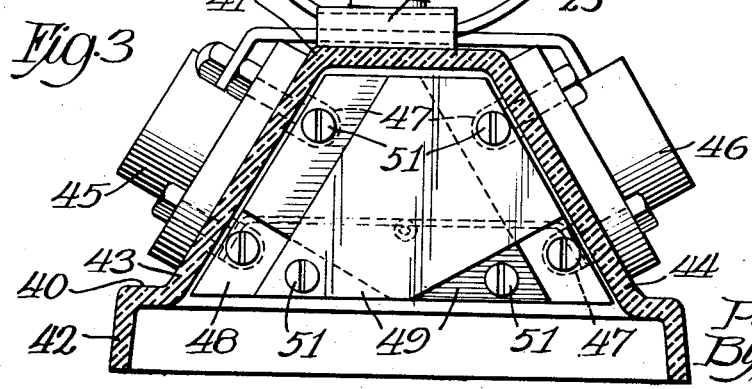
Inventor
Paul E. Klopsteg
By Wilson, Mann & Co.
Attys.

July 18, 1933.　　　　　P. E. KLOPSTEG　　　　　1,918,402
RADIO DEMONSTRATION APPARATUS
Original Filed Nov. 4, 1929　　4 Sheets-Sheet 2
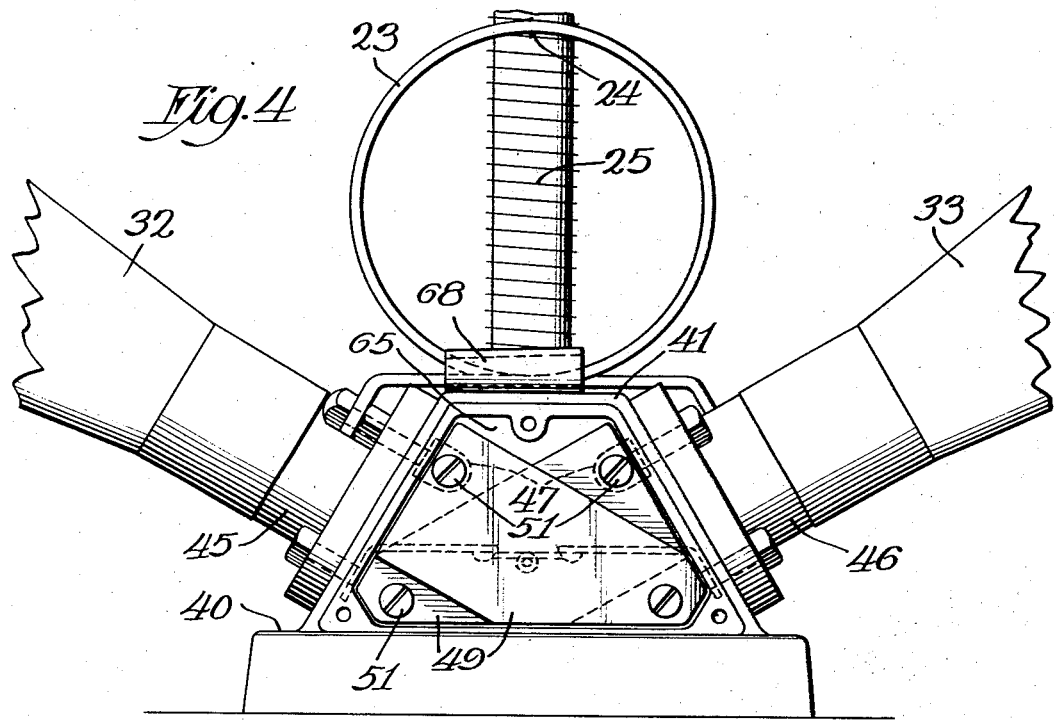
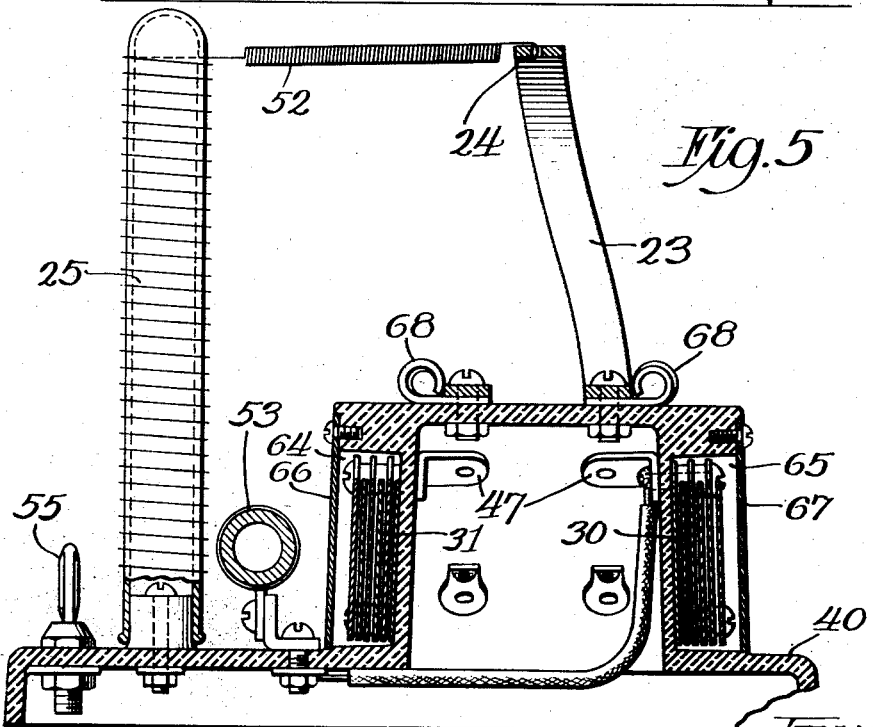
Inventor
Paul E. Klopsteg
By Gilson, Mann & Co.
Attys.

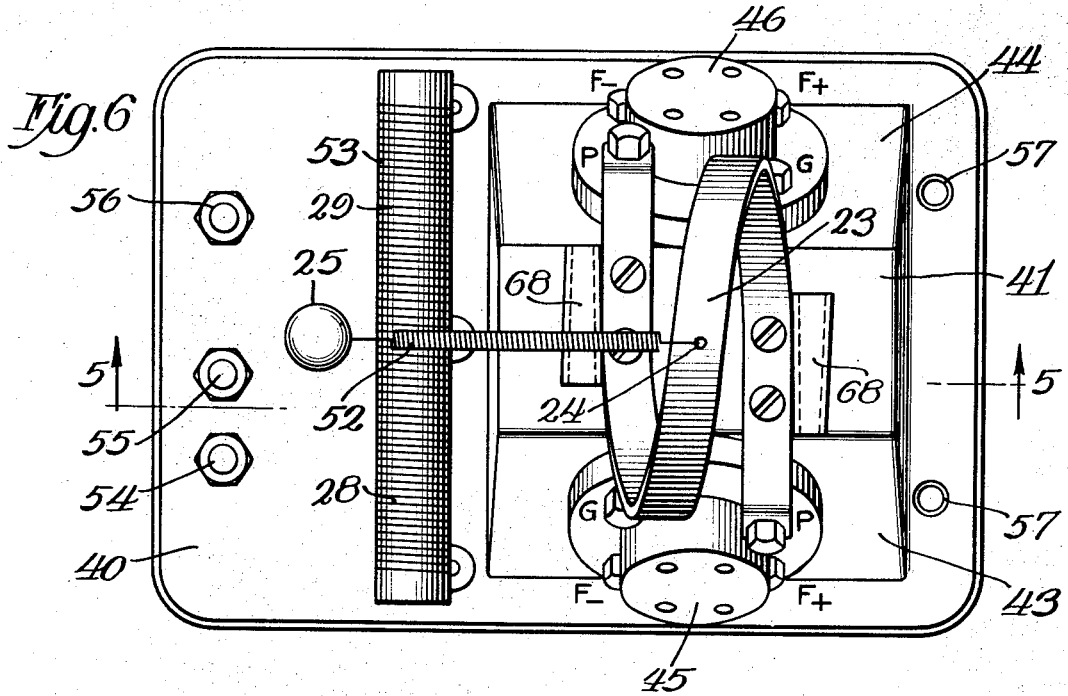
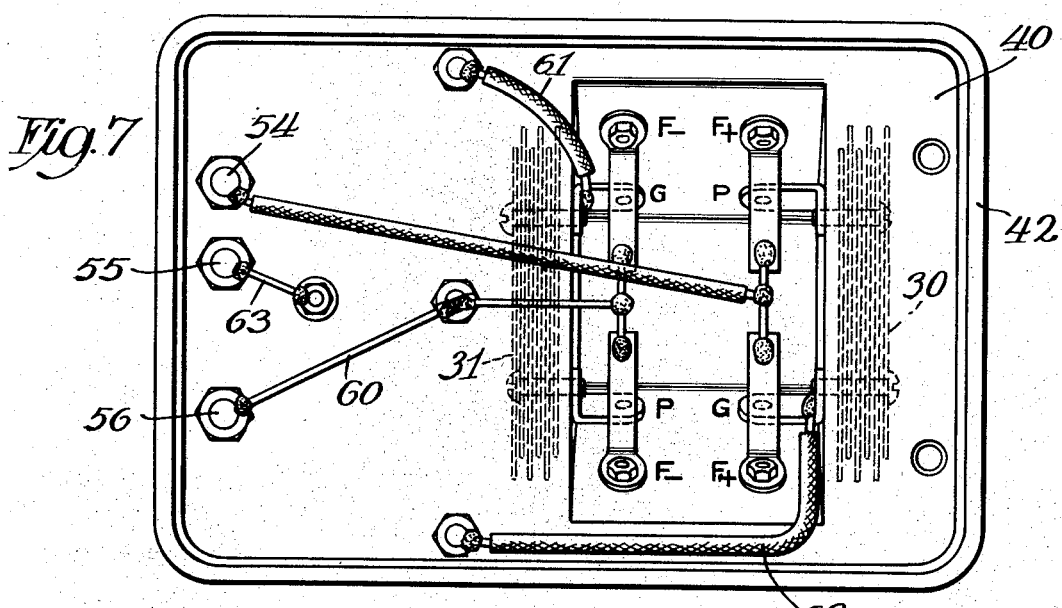
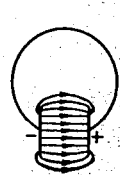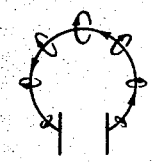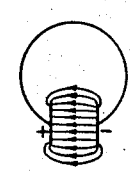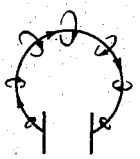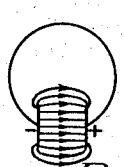

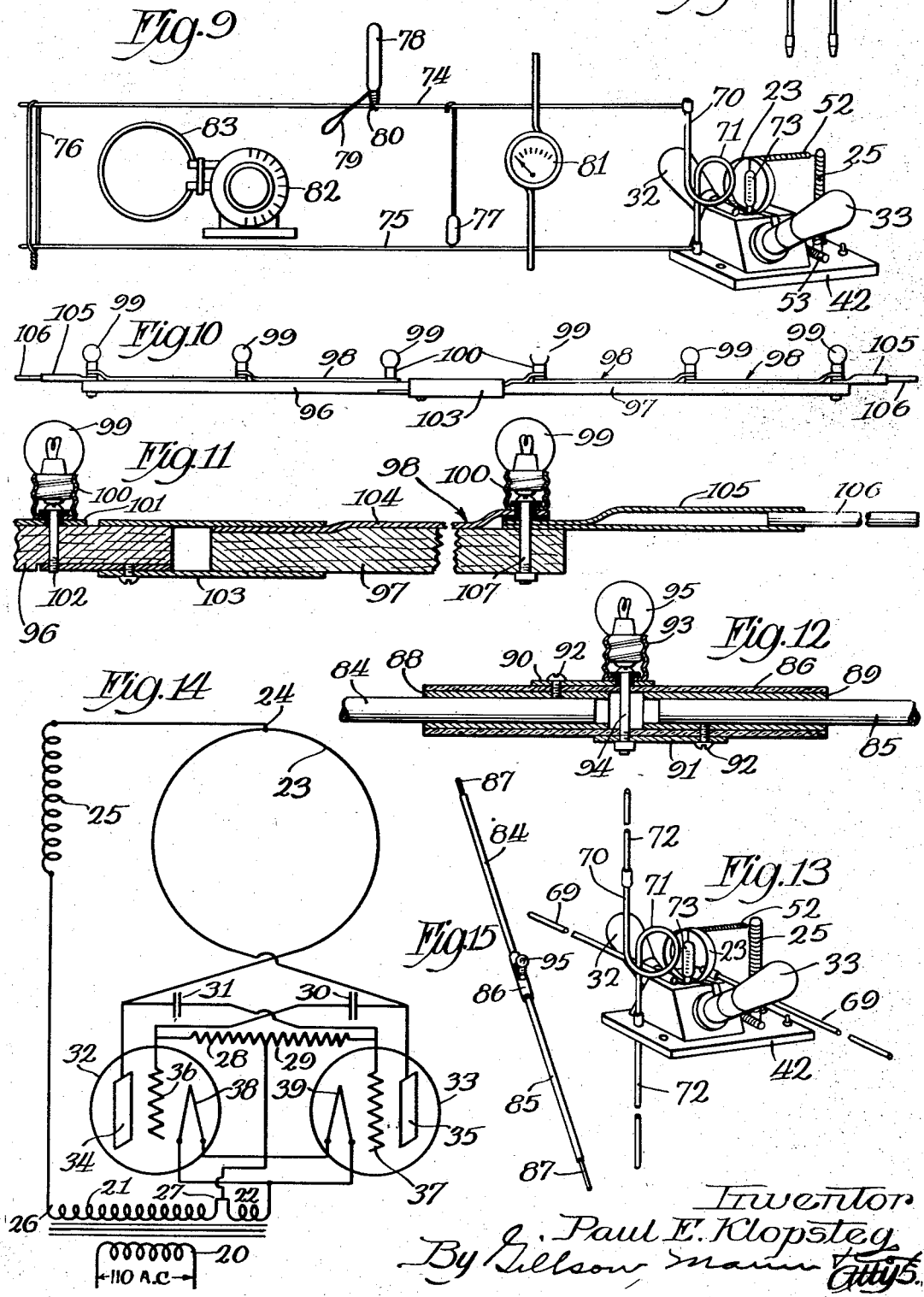

Patented July 18, 1933

1,918,402

UNITED STATES PATENT OFFICE

PAUL E. KLOPSTEG, OF EVANSTON, ILLINOIS, ASSIGNOR TO CENTRAL SCIENTIFIC COMPANY, OF CHICAGO, ILLINOIS, A CORPORATION OF ILLINOIS

RADIO DEMONSTRATION APPARATUS

Continuation of application Serial No. 404,631, filed November 4, 1929. This application filed February 7, 1933. Serial No. 655,682.

This application is a continuation of my copending application Serial No. 404,631, for radio demonstration apparatus, filed November 4, 1929.

This invention relates to means for demonstrating by experiment the fundamental principles of radio transmission of energy, and has among its objects to provide apparatus of this character which will meet the usual requisites of educational apparatus, such for example as durability, compactness and simplicity; which will visibly demonstrate the transmission and reception of electro-magnetic waves within the confines of an ordinary classroom; which is sufficiently simple in structure, theory and operation that a person of ordinary scientific knowledge may make the demonstration; and which has the capacity to set up radiations of sufficient strength that reception may be convincingly shown under varying conditions of reception without the use of delicate apparatus.

Further objects and advantages will become apparent as the disclosure proceeds and the description is read in conjunction with the accompanying drawings, in which Fig. 1 is a sectional view of a preferred embodiment of the oscillator;

Fig. 2 is a bottom plan view of the same;

Fig. 3 is a transverse, sectional view taken on the line 3—3 of Fig. 1;

Fig. 4 is an end elevational view of a slightly modified form of the oscillator unit having the end cover plates removed;

Fig. 5 is a longitudinal, sectional view of the form shown in Fig. 4, taken on the line 5—5 of Fig. 6.

Fig. 6 is a plan view of the modified form;

Fig. 7 is a bottom plan view of the same showing clearly the wiring employed in the oscillator circuit;

Fig. 8 is a series of diagrammatic representations showing the phenomena which take place in the inductive coil at different stages in a cycle of oscillation;

Fig. 9 is a view partly in perspective, and partly in elevation of the apparatus set up for demonstrating standing waves;

Fig. 10 is a view illustrating a type of receiver adapted to show the distribution of potential throughout its length;

Fig. 11 is a sectional view taken through its mid-joint;

Fig. 12 is a sectional view of a portion of another type of receiving unit;

Fig. 13 illustrates the oscillator unit equipped with various radiating antennæ;

Fig. 14 is a wiring diagram of the oscillator circuit;

Fig. 15 is a perspective view of the type of receiver shown in Fig. 12; and

Fig. 16 shows a coupler loop adapted to be used for producing standing waves on a parallel wire system lying in a horizontal plane.

The apparatus consists essentially of a short wave oscillator in which the oscillations are maintained by means of electron tubes, two sets of sending antennæ, a power supply unit and tunable receiving antennæ. Other elements or devices are provided for making various experiments, such for example as several small neon glow lamps, a wave meter, an incandescent lamp, and an ammeter which, in this case, is in the form of a Weston thermo-galvanometer.

The oscillator circuit is designed preferably to generate oscillations at a frequency in the neighborhood of 100,000,000 cycles per second, which produces waves of approximately three meters in length. The circuit is diagrammatically shown in Fig. 14 and consists essentially of a transformer having a primary coil 20 connected to a suitable source of alternating current supply such as the usual 110 volt circuit, and having a high voltage secondary winding 21 which supplies the plate current for the oscillator tubes, and a low voltage secondary winding 22 supplying the filament current.

The oscillator coil or loop 23 has its midpoint at 24 connected through a suitable choke coil 25 to one terminal 26 of the secondary winding 21, the other terminal 27 of the winding being connected through resistances 28 and 29, condensers 30 and 31 to the ends of the oscillator coil 23. A pair of oscillator tubes for maintaining the oscillations in the coil 23 are provided at 32 and 33, the plates 34 and 35 being connected to the ends of the coil, the grids 36 and 37 being connected through condensers 30 and 31, respectively, to the opposite ends of the coil to which the respective plates are connected. The filaments 38 and 39 of the oscillator tubes receive their energy from the low voltage winding 22 of the transformer.

When the oscillator is functioning, a quantity of electricity is surging back and forth at high frequency in the oscillator loop. The rate at which this surging takes place is determined by the inductance of the loop and the distributed capacitance of the conducting materials to which the ends of the loop are connected. The oscillation of the charge in the loop constitutes a current of high frequency associated with which there is a corresponding oscillating magnetic field which extends through the loop at right angles to the electric field. At the instant the current reverses, the ends of the loop are at a large potential difference and the current is zero. This condition gives rise to an electrostatic field across the ends of the loop. At the instant the current is maximum, the electrostatic field is zero.

A complete cycle of oscillation is diagrammatically shown in Fig. 8. The vacuum tubes, which are employed in connection with the circuit, serve the purpose of sustaining the oscillations through the coil. The first diagram on the left represents conditions existing at some given instant, which for convenience will be considered the beginning of the cycle.

At this instant, no current is flowing through the loop but a high potential difference exists between the ends of the loop. At this point, we assume that the right hand side of the loop is positive, the left, negative.

Because of the electrostatic field existing across the capacitance, a current is set up in the loop in a counterclockwise direction, as shown in the second diagram. At the moment the current reaches its maximum value, the potential difference between the ends of the loop reaches zero and the electromagnetic field at right angles to the loop reaches its maximum. Because of the inductance in the circuit, the current continues to flow in the same direction which results in an increasing positive charge at the left and a corresponding negative charge on the right side, as shown in the third diagram.

When the current flowing through the loop reaches zero, the electrostatic field across the capacitance is again at its maximum, but with the positive and negative charges reversed. As a result, a clockwise current is sent through the loop in a manner similar to that explained in connection with the second diagram. Finally the cycle of operation is completed and the conditions existing at the beginning of the cycle are once more obtained.

In the preferred embodiment of this invention, the oscillator unit comprises a base 40 preferably of insulating material such as bakelite having an upstanding condenser housing 41 integral therewith. Downwardly extending flanges 42 are provided for the base to allow a clearance for the wiring of the oscillator and various other connections.

The side walls 43 and 44 of the condenser housing have secured to them suitable tube sockets 45 and 46. The securing bolts for the sockets extend through the side walls of the housing and serve to hold brackets 47 in place, which not only support the condensers 30 and 31, but also act as terminals for the oscillator tubes. For convenience, the filament terminals are marked in the drawings with an F— and F+, the grid terminal with a G, the plate terminal with a P.

The condensers are of the form shown and comprise an insulating base 48 having two sets of plates 49, the plates in each set being separated by metal washers 50 and held in place by screws 51. Inasmuch as the tube terminals support the insulating base 48, this provides a very simple construction and a great saving of material in housing the condensers.

The ends of the inductive loop or coil 23 are connected by means of the socket bolts to the plate terminals of the sockets. The choke coil 25 is mounted vertically upon the base and is connected by means of a conductor, which may be in the form of a coiled wire 52, to the mid-point 24 of the oscillator coil.

The resistances 28 and 29 are mounted on a core 53 secured to the base 40, and spring plugs 54, 55 and 56 are located nearby to receive the power supply from the transformer. Inasmuch as the plugs are unequally spaced from each other, the triple connector socket (not shown), which fits over them to make the proper connection with the transformer cannot be inadvertently turned end for end when connection with the transformer is being made.

Antennæ sockets 57 are provided along one edge of the base for receiving suitable antennæ which are adapted to cooperate with the inductive loop in emitting radiations from the oscillator unit. The antennæ sockets are tapered at each end as clearly shown in Fig. 1 to more firmly engage the correspondingly tapered ends of the antennæ. The location of the antennæ sockets is such as to permit vertical antennæ being employed which extend below the plane of the base, in which case the oscillator unit is placed near the edge of the table or other means of support, with the antennæ sockets overhanging the table.

The wiring of the oscillator unit follows the circuit diagram of Fig. 14, the plug 54 connecting with one terminal of the secondary winding 22 of the transformer; the plug 55 connecting with the terminal 26 of the secondary winding 21; and the plug 56 connecting with the terminal 27 of the secondary coils. A conductor 58 serves to connect the plug 54 with the positive sides of the filaments, the conductors 59 and 60 connecting with the negative sides of the filaments to complete the filament circuit.

Electrical connection is made between the ends of the resistances 28 and 29 and the grids 36 and 37 of the oscillator tubes by means of the conductors 61 and 62. The brackets 47 which serve as the terminals for the tube grids are electrically connected through the condensers to the ends of the oscillator coil 23. A short conductor 63 extends between the plug 55 and the choke coil 25 to complete the circuit.

In the modified form of oscillator, the condensers 30 and 31 are located in pockets 64 and 65 provided in the base. Cover plates 66 and 67 are provided for protection of the condensers. In all other respects, the modified form is similar to the preferred form and no further description need be given.

In both the preferred and modified forms of the oscillator unit, means are provided for employing horizontal antennæ as well as vertical antennæ. These means may take the form of tapered spring sockets 68 secured to the top of the condenser housing and directly connected with the ends of the oscillator coil 23.

Various forms of antennæ may be employed in connection with the oscillator unit, but preferably the antennæ are in the form of hollow brass rods 69 having tapered ends that may be readily inserted in the sockets 68. There is also shown in Figs. 9 and 13 a second antenna, such as 70, that is coupled by means of its position with respect to the coil 23 so that when current is flowing in the coil 23, a current is induced in the loop 71 of the antenna. Vertical extensions, such as 72, may be provided which can be attached or detached in a manner similar to that of attaching the rods 69 to the coil 23.

The operation of the oscillator has already been described. In order to test whether or not the oscillations are being produced, it is only necessary to touch the exposed metal terminals of the coil 23 with a piece of metal or the tip of a lead pencil. If the circuit is operating, sparks will be obtained at the contact. Another way for testing whether or not oscillations are being set up is by means of a neon test lamp 73, which may be suspended from the mid-point of the coil 23, as shown in Figs. 9 and 13, or which may be simply placed across the ends of the loop. In either case, if the circuit is operating, the test lamp glows brightly.

Referring now to Fig. 9, there is illustrated a simple method of measuring wave length by what is commonly known as the Lecher wire method. Standing waves are generated on a pair of parallel wires 74 and 75 by coupling the oscillator to the vertical antenna coupler 70 to which the wires 74 and 75 are connected. Preferably, the wires are greater than five meters in length, and are supported at their outer ends by any suitable means which insulate the wires from each other.

When the oscillator is operating, standing waves are produced on the wires if the parallel wire system is in resonance, i. e. if the length of the wires bears a definite relation to the wave length. The ends of the wires, will, of course, be points of maximum potential variation as long as they are insulated from each other.

If, however, these wires are connected as by means of a wire bridge 76, they will then be at the same potential at this point, and will form potential nodes. The wire bridge 76 then is moved along the parallel wires toward the oscillator until a glow lamp connected across the wires, as at 77, about 80 cm. from the antenna 70, glows most brightly. This indicates then that the length of the wires 74 and 75 from the wire bridge 76 to their inner ends is a multiple half-wave length. When such a point is reached, the glow lamp connected to the oscillator coil will show a sudden lowering in intensity due to the fact that a greater amount of energy is being withdrawn from it by the tuned system made up of the wires 74, 75 and 76.

The field intensity may be also tested or explored along the wires 74 and 75 in various ways. For example, an incandescent lamp 78, advantageously provided with a conducting handle 79 and a wire arc 80 soldered to its base terminal, may be moved along one of the wires and will be brightly illuminated in regions of high potential and become dark in regions of small potential. When the lamp glows brightly under these conditions, the current which heats its filament is passing from the wire through the lamp and to the body of the experimenter.

The nodal points of potential can be even more accurately located by sliding another bridge similar to the bridge 76 along the parallel wires. As each nodal point is passed, the glow lamp 73 in the oscillator will suddenly diminish in intensity due to the energy being abstracted from the oscillator which is maximum at resonance.

Still another way of testing or exploring the standing waves is by moving a thermo-galvanometer 81 along but not touching the wires 74 and 75. In this manner, the maximum and minimum points of electric force along the wires may be quickly found.

If desired, a wave meter 82 may be employed to quickly ascertain the length of the wave set up by the oscillator. This may be accomplished in the well known manner of holding the loop 83 of this meter parallel to and a short distance from the oscillator coil. When the wave meter is tuned to resonance with the oscillator which may be indicated by bridging a neon test lamp across the ends of the loop 83, the wave length will be indicated on the dial of the wave meter.

For some experiments, it may be desirable to have the wires 74 and 75 lie in a horizontal plane. This can be easily accomplished by employing an inductive loop in the form of an inverted U as shown in Fig. 16, the tapered ends of the loop being engageable in the two sockets provided in the oscillator base.

The foregoing description of experiments which are possible with the apparatus of this invention has dealt with the creation of standing waves on a system of parallel wires.

The apparatus is also adapted and is capable of radiating electromagnetic waves which may be detected within given distances by suitable receiving devices, the simplest of these being illustrated in Figs. 12 and 15. It comprises a pair of tubular rods 84 and 85 which are socketed in a common sleeve 86 and which are provided with telescoping extensions 87 for varying the total length of the receiving antenna. Preferably the sleeve 86 is of insulating material and is provided with metallic bushings 88 and 89 separated from each other at the center of the sleeve. Short metallic strips 90 and 91 are secured to the outer face of the sleeve and are electrically connected by means of screws 92 to their respective bushings. An incandescent lamp socket 93 is mounted on the strip 90, and the screw 94, insulated from the lamp socket, extends through the sleeve and furnishes electrical connection with the strip 91. An incandescent bulb 95 is placed in the socket and the base terminal is adapted to engage the head of the screw 94. The circuit, therefore, can be traced from the tubular rod 85 through the bushing 89, screw 92, strip 91, lamp socket screw 94, base terminal of the incandescent lamp, socket casing 93, strip 90, the other screw 92, bushing 88 and the tubular rod 84.

In order to illustrate the transmission and reception of the waves originating in the oscillator, radiating antenna such as the rods 69 may be attached to their respective sockets 68 of the oscillator coil, and then by ascertaining the wave length by the wave meter, it is possible to determine approximately the wave length of the waves set up, and knowing this, the receiving antenna may be adjusted to roughly one-half the wave length. This receiver when held horizontally will respond to the waves being radiated and the bulb 95 will glow brightly.

By adjusting the length of the receiving unit by manipulation of the extensions 87, fine adjustments may be made to the setting at which the bulb flows most brightly, and this in effect is another check on the wave length. If the receiver is turned at right angles to the sending antenna, that is to a vertical position while the radiating rods 69 are horizontal, it will be found that no response can be obtained. This shows polarization of the radio wave. By substituting the vertical antenna, which comprises the variable coupler 70 and extension rods 72, it will be found that the receiving antenna must be placed in a vertical position to obtain the maximum effect.

Another form of receiving device is shown in Figs. 10 and 11. In this receiver, the distribution of potential may be visibly demonstrated by the use of a plurality of incandescent lamps placed at various positions along its length. In this construction, two elongated wooden members 96 and 97 are employed, preferably square in cross section, and the antenna is made up of a series of metallic strips 98 suitably carrying incandescent bulbs 99 at their junctures. The particular construction employed is shown most clearly in Fig. 11 and, as there illustrated, the member 96 is provided with a sleeve engageable with the slightly reduced end of the member 97 and furnishing suitable electrical connection between the two members. More specifically, one side of the filament in the incandescent lamp at the left is electrically connected through the socket 100 to the metallic strip 101, and the other side of the filament makes contact through the base terminal with a screw 102 insulated from the socket 100 and which is connected through a conductor with a metallic sleeve 103.

This electrical connection is continued through the metallic strip 104 to the socket casing of the next lamp where it is carried through the filament and out through the base terminal to the next lamp and so on.

At the extreme right of Fig. 11, the end lamp is shown connected between one of the antennæ strips 98 and a tubular extension 105 having a telescoping rod 106 for varying the total length of the receiver. As shown, the electrical connections for this lamp, which are illustrative of the connections for the other lamps, are made by connecting the base terminal through the screw 107 to the flattened end of the tubular extension 105, and by allowing the lamp socket to contact with the raised end of the antenna strip which leads from the adjacent lamp. Suitable insulating washers are, of course, provided.

In place of using an electric incandescent bulb for detecting the presence of radio waves, a thermo-galvanometer may be employed to quantitatively indicate the field strength of the radiations, such for example as the thermo-galvanometer 81 provided with suitable extensions. With this type of receiving device, the polarization of the radio wave may be strikingly demonstrated.

In each of the experiments in which the coupler 70 is employed, the effect of changing the coupling by rotating the coupler in its socket can be readily shown. For example, by holding the receiving antenna at arm's length parallel to the sending antenna made up of the coupler 70 and the extensions 72, the change in power transferred to the receiving unit when the coupler is moved out of its parallel relation with the inductive loop 23, is shown by the reduced brilliancy of the incandescent lamp of the receiving unit.

In fact, when the coupler loop is at right angles to the inductive loop, there is little, if any, response from the receiving unit. This reduction in power transmission can, of course, be quantitatively shown by using the thermo-galvanometer receiving unit 81 when provided with suitable extensions.

Many other experiments may be carried out with this apparatus by combining different accessories therewith in various relations, and one in particular is worthy of notice, this being the polarization in two planes of the waves so as to obtain a single polarized wave of great intensity. To accomplish this, the horizontal and vertical radiating antennæ are both used as shown in Fig. 13. The receiver then responds in either a vertical or horizontal position, that is, whenever the receiving antenna is parallel to one of the radiating antenna. It responds with great intensity when the receiver is tilted in one direction to an angle of 45° to the horizontal, but when tilted in the opposite direction, to a like angle, there is no response. The reason for this is that in one pair of quadrants, the oscillations from the two antennæ are in phase and strengthen each other, and in the other, they are out of phase and counteract each other.

It is apparent that the invention may be embodied in other specific forms without departing from the spirit or attributes thereof, and the present embodiments of the invention are to be considered in all respects as illustrative and not restrictive, reference being had to the appended claims rather than to the foregoing description to indicate the scope of the invention.

What I claim, therefore, is:

1. In educational apparatus for demonstrating the principles governing the production of short wave oscillations and their transmission through space, the combination of a raised base having an integral upstanding housing thereon, a pair of condensers mounted within the housing, tube sockets mounted on opposite side walls of the housing, a single turn oscillator coil mounted on the top wall of the housing, antenna holders directly associated with the ends of the oscillator coil adapted to support a horizontal antenna, means within the housing for electrically connecting the condensers with the tube sockets to form a part of an oscillator circuit, and a socket in the base adapted to support a second antenna inductively coupled with the oscillator coil.

2. In educational apparatus for demonstrating the principles governing the production of short wave oscillations and their transmission through space, the combination of a raised base having an upstanding integral housing, two opposite side walls of which are inclined from the vertical, a tube socket mounted on each of the inclined walls, a pair of condensers within the housing directly connected to the tube sockets, an oscillator coil on the top wall of the housing, the ends of which are electrically connected with the tube sockets, means including the condensers, tube sockets and oscillator coil for setting up short wave oscillations in the coil, and a pair of sockets directly associated with the ends of the oscillator coil adapted to receive horizontal radiating antennæ, means on the base for supporting an antenna in inductive relation to the oscillator coil, and means for varying said inductive relation.

3. A tunable receiving antenna for demonstrating to students the reception of radio waves comprising two parts, one of which includes an elongated rod provided with extensible means for varying the total length of the rod, and an incandescent bulb electrically interposed between the two parts for indicating a reception of radio waves.

4. A tunable receiving antenna for demonstrating to students the reception of radio waves comprising two parts, one of which includes an elongated rod provided with extensible means for varying the total length of the rod, an incandescent bulb electrically interposed between the two parts for indicating a reception of radio waves, and an insulating sleeve adjacent the bulb.

5. A tunable receiving antenna for demonstrating to students the reception of radio waves comprising two parts, one of which includes an elongated rod provided with extensible means for varying the total length of the rod, and an ammeter electrically interposed between the two parts for quantitatively indicating a reception of radio waves.

6. A multi-part extensible receiving antenna for indicating a reception of radio waves and the distribution of potential therein and including a plurality of incandescent bulbs electrically interposed between the parts of the antenna.

7. An educational apparatus for demonstrating the principles governing the production of short wave oscillations and their transmission through space, the combination of a base, an upstanding oscillator coil mounted on the base, means for setting up oscillations in said coil, and antenna sockets connected with and adjacent the ends of the coil for detachably supporting a rod antenna.

8. In educational apparatus for demonstrating the principles governing the production of short wave oscillations and their transmission through space, the combination of a base, a single turn upstanding oscillator coil mounted on the base, means for setting up oscillations in said coil, antennæ sockets connected with and adjacent the ends of the coil for detachably supporting oppositely extending horizontal radiating antennæ, and a vertical antenna adapted to be detachably supported on the base and including a single turn loop for variably coupling the vertical antenna with the oscillator coil.

9. A tunable receiving antenna for demonstrating to students the reception of radio waves, comprising a two part elongated rod provided with extensible means for varying the total length of the rod, and means interposed between the two parts of the rod for indicating a reception of radio waves, said rod and means being adapted to be grasped in the hand and carried from place to place.

10. In educational apparatus for demonstrating the principles governing the production of short wave oscillations and their transmission through space, the combination of a base, an oscillator coil mounted on the base, means for setting up oscillations in said coil, radiating antennæ associated with the coil, and receiving means for detecting the presence of radiated energy at relatively short distances from the oscillator, said means comprising a two part antenna, one of which includes an elongated rod provided with extensible means for varying the total length of the rod, and means interposed between the two parts of the antenna for indicating a reception of radio waves, said rod and means being adapted to be grasped in the hand and carried from place to place.

PAUL E. KLOPSTEG.